United States Patent [19]

Kolb, Jr.

[11] 4,367,930
[45] Jan. 11, 1983

[54] SOUND REPRODUCTION METHOD AND APPARATUS

[75] Inventor: Frederick J. Kolb, Jr., Rochester, N.Y.

[73] Assignee: Eastman Kodak Company, Rochester, N.Y.

[21] Appl. No.: 246,497

[22] Filed: Mar. 23, 1981

[51] Int. Cl.³ .............................................. G03B 31/02
[52] U.S. Cl. ...................................... 352/27; 369/120; 369/125
[58] Field of Search .................. 352/27; 369/107, 108, 369/120, 125; 355/77

[56] References Cited

U.S. PATENT DOCUMENTS

| Re. 23,802 | 3/1954 | Sheldon . | |
|---|---|---|---|
| 2,642,538 | 6/1953 | Orbach | 3 55/77 |
| 3,226,228 | 12/1965 | Deitz | 355/77 |
| 4,051,374 | 9/1977 | Drexhage et al. . | |
| 4,149,902 | 4/1979 | Mauer et al. . | |

FOREIGN PATENT DOCUMENTS 644574 10/1950 United Kingdom .................. 352/27

OTHER PUBLICATIONS

H. O. Pritchard, R. W. Nicholls and A. Lakshmi, "Ultraviolet sensitization of silicon detectors for space astronomical applications," *Applied Optics*, vol. 18, No. 13, 7/1/79, p. 2085.

Primary Examiner—Monroe H. Hayes
Attorney, Agent, or Firm—David M. Woods

[57] ABSTRACT

Optical sound reproduction method and apparatus are provided for use with motion picture film having an optical dye sound track. The sound track preferentially modulates visible radiation while the silicon photoreceptor incorporated in the sound reproduction apparatus preferentially responds to infrared radiation. By positioning a suitable energy conversion device between the sound track and the photoreceptor, the modulated visible radiation—prior to striking the photoreceptor—is transduced into modulated radiation of longer wavelength nearer to the infrared portion of the spectrum. The signal provided by the photoreceptor is correspondingly enhanced since the impinging radiation has been shifted in wavelength toward the preferential response region of the photoreceptor. One suitable energy convertor is a fluorescing layer that absorbs visible radiation and emits radiation of longer wavelength in response thereto.

15 Claims, 13 Drawing Figures

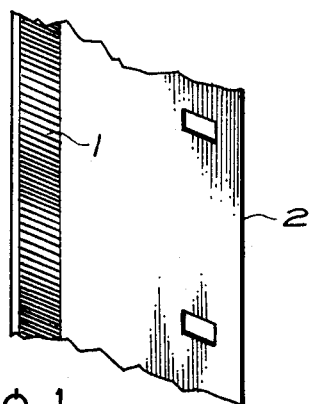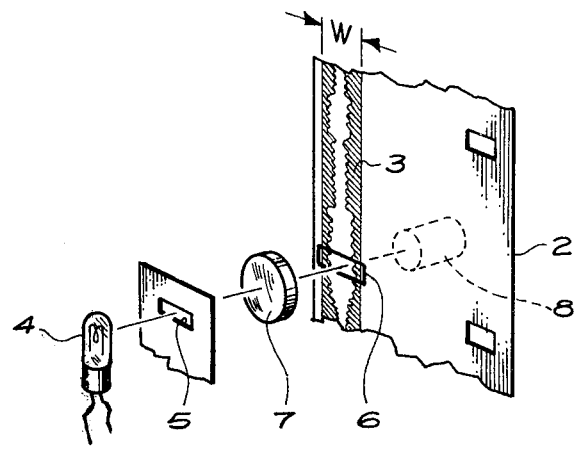
Fig. 1
Fig. 2
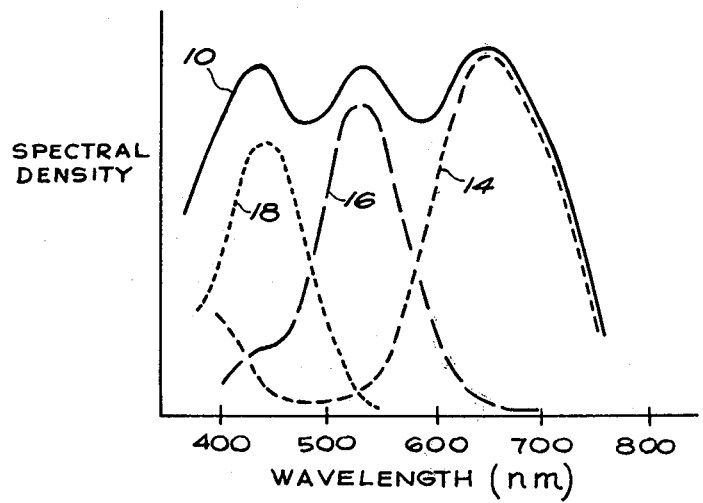
Fig. 3
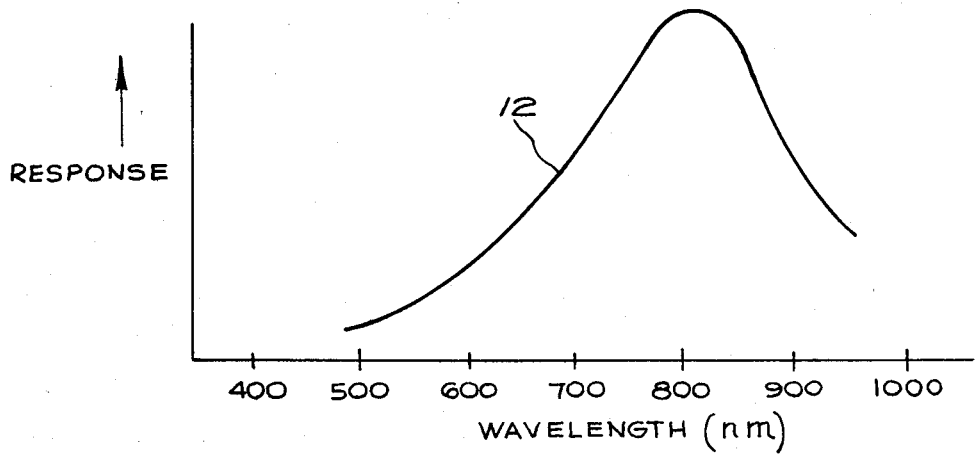
Fig. 4

SOUND REPRODUCTION METHOD AND APPARATUS

BACKGROUND OF THE INVENTION

1. Field of the Invention

The present invention relates to apparatus for producing a modulated signal from an optical motion picture sound track. More specifically, the invention relates to sound reproduction apparatus that is responsive to density variations of an optical dye sound track.

2. Description of the Prior Art

Optical motion picture sound tracks generally come in one of two forms, either variable-density or variable-area (width). As shown in FIG. 1, a variable-density track image 1 on a motion picture film 2 consists of a constant-width strip the density of which varies from dark to light as a function of the sound recorded. It is characterized by bars of varying density in narrow lateral lines along the edge of the film.

As shown in FIG. 2, a variable-area track image 3 consists of a transparent strip whose width W (and, hence, area) varies as a function of the volume and frequency of sound recorded. It is characterized by one or more narrow, irregular, very dense patterns along the edge of the film. The rate of spatial repetition of the irregular edges determines the frequency of the recorded sound while the width of the transparent portion determines the volume of the recorded sound. For optimum quality on a variable-area sound track image, the clear portions should be as transparent as possible, and the dark portions should be nearly opaque, with a density between 1.0 and 1.5.

The present invention is equally applicable to either type of sound track image. However, to simplify the disclosure, the description will be with reference to variable-area sound track images only.

Turning again to FIG. 2, the basic elements are shown for reproducing sound information from an optical sound track image. Illumination from a lamp 4 is restricted by a narrow slit 5 so that an image 6 of the slit is produced on the film by an objective lens 7. A photoreceptor 8 is placed on the opposite side of the film to receive light transmitted through the transparent areas in the track. Since the width of the transparent area of the track 3 is a function of the recorded sound, the illumination reaching the photoreceptor 8 is likewise a function of the sound signal used to generate the density variations in the track image. For that reason the light striking the photoreceptor 8 is said to be modulated by the optical sound track image.

The effectiveness with which a photographic sound track is reproduced is a function of the spectral energy distribution of the illuminant, the spectral absorption of the sound track image, and the spectral response of the photoreceptor. Illumination is usually provided by a comparatively low color temperature tungsten sound lamp that radiates much more strongly in the infra-red than in the visible spectrum. A typical photoreceptor incorporates a silicon substrate material that is preferentially responsive to radiation in the infrared region. Therefore it is desirable that sound track images have significant, if not peak, absorption in the red to infrared spectral region. Such sensitivity would make the spectral absorption (i.e., modulation) of the sound track material correspond to the spectral emission of available illuminates and the spectral region of greatest receptivity of the conventional receptor. However, a useful material for forming the sound track density image is the color dye used in the production of the color image on the motion picture film. The great majority of such dyes absorb radiation predominantly in the visible region of the spectrum, becoming relatively transparent in the near infrared region and beyond. Consequently, such color dyes do not sufficiently absorb the infrared emission of the sound lamp to adequately modulate the transmitted infrared light. Moreover, the unmodulated infrared component that passes through the sound track excites the conventional photoreceptor to produce an undesirable noise component in its output signal when used in conjunction with color dye sound track images.

Referring to FIGS. 3 and 4, the disadvantages of conventional sound photoreceptors can be appreciated through comparison of the spectral dye density curve 10 (FIG. 3) of a typical motion picture color print film with the spectral response 12 (FIG. 4) of a typical silicon photoreceptor to tungsten illumination. The curve 10 represents the additive combination of the spectral dye densities of the three component dye layers of a typical color film, e.g., the cyan-forming layer 14, the magenta-forming layer 16 and the yellow-forming layer 18. For ease of illustration and explanation, the composite spectral dye density curve 10 will be hereafter used to describe absorption in a conventional optical dye sound track. As FIG. 3 shows, peak modulation occurs in the visible region of the spectrum where most of the density is generated, i.e., from wavelengths of about 400 to approximately 700 nanometers. Furthermore, the track possesses very little density to radiation of wavelengths longer than about 700 nanometers, e.g., infrared radiation. This means that infrared light directed through the film track is substantially unmodulated by density in the track, and contributes to overall noise in the sound reproduction system.

On the other hand, FIG. 4 shows that the spectral response 12 (to tungsten illumination) of a typical silicon material used in a sound photoreceptor peaks at a wavelength of about 800 nanometers, i.e., in the infrared region of the spectrum. This means that the photoreceptor most efficiently responds to light modulated toward the infrared region of the spectrum. But, as described above, the sound track does not effectively modulate light in this region. This inconsistency has been a problem in motion picture sound systems since the introduction of color motion picture film.

To broaden the spectral absorption of the sound track while controlling the noise problem, sound systems of the prior art have utilized coatings on the optical sound track which are responsive to infrared energy. For example, sound track images have been produced with silver or silver compounds, either by a completely separate redevelopment step, or by means of edge treatment of the film at some stage of the processing. The film is passed through a sound-track applicator that deposits a viscous developer or a sulfide solution on the sound track to produce a metallic silver or silver sulfide image. The boundary of the area of action of the developer fluid must be confined to a zone corresponding to the width of the optical sound track, and the action of the fluid must be uniform across the zone of application. Since the developer employed is relatively potent, any spread of the developer into the image area will be immediately destructive of the image. Thus the sound-track applicator requires careful design and precision fabrication while careful control of the viscosity, temperature, and moisture content of the partially developed film is necessary for successful redevelopment. The redevelopment process provides color print films with an optical sound track image consisting of a metallic silver image corresponding to the dye image which still remains in the track. Since the silver image has a relatively uniform spectral absorption through the visible and near-infrared regions, the silver is the effective part of the track, and the dye contributes relatively little. Reversal color films have a silver track image without dye, or in some cases, a track consisting of silver sulfide, which is a reasonably good infrared absorber.

Due to the extremely small dimensions of the sound track in small film formats, e.g., 16 mm and 8 mm, redevelopment is technically complex and can result in a high proportion of losses. To avoid redevelopment and adapt the specral sensitivity of the photoreceptor to the spectral region of greatest sound modulation, a photoreceptor can be used which has sensitivity only in the visible region, where the dye track most effectively modulates the light. This has been indirectly accomplished in the prior art by confining the response of a conventional photoreceptor to the visible portion of the spectrum. For example, Super 8 projectors adapted for use with dye sound tracks have been provided with a photoreceptor having a filter that blocks the infrared component of the impinging light. The photoreceptor, although still inherently responsive in the infrared, is thus confined to "see" only visible light modulated by the dye sound track image. However, the preferred silicon photoreceptors have a much lower response in the visible region compared to their peak response in the infrared region of the spectrum. Therefore the signal-to-noise figure of the filtered photoreceptor is less than the device's inherent capability. Thus the use of dye tracks ordinarily represents some compromise of sound quality compared to the use of silver or silver sulfide tracks with a given type of receptor.

Since the sound modulation signal is mainly determined by the absorption characteristics of the track material in the spectral region in which the photoelectric cell is sensitive, it may at first appear worthwhile to use a dye material, in at least one of the film layers, having peak absorption in the infrared region. While this has been considered from time to time, it does not appear beneficial as a general solution since the choice of dye material would necessarily be limited by sound track considerations, rather than by considerations of the photographic image.

Thus with present sound reproduction techniques there is a choice between, on the one hand, a technically exacting redevelopment process for restructuring the dye sound track or, on the other hand, a dye-based system incorporating a photoreceptor confined to respond to radiation in a less preferential response region.

SUMMARY OF THE INVENTION

In accordance with the invention, optical sound reproduction method and apparatus are provided for converting modulated optical energy in the absorption region of a sound track to optical energy in the preferential response region of the photoreceptor.

In the disclosed embodiment of the apparatus, the optical sound reproduction apparatus is used with a motion picture projector having a lamp disposed to emit radiation along a path toward a motion picture film. The film includes an optical sound track having sound-related density variations that are predominantly absorptive of light radiation in a first spectral region. A fluorescent converting means is positioned in the path relative the sound track for absorbing at least a portion of the unabsorbed radiation in said first spectral region transmitting the sound track and for emitting radiation predominantly located in a second spectral region. A photoreceptive means that is responsive to the emitted radiation in the second spectral region generates signals representative of the sound-related density variation in the sound track.

In the disclosed embodiment of the method, the optical sound reproduction method includes the step of illuminating the optical sound track with radiation in a first spectral region. The motion picture film having the sound track is then advanced to modulate the radiation in the first spectral region that is transmitted by the sound track. A portion of the modulated radiation within the first spectral region is converted into modulated radiation within a second region of the spectrum. Then a sound signal is generated responsive to the modulated radiation.

BRIEF DESCRIPTION OF THE DRAWINGS

The invention will be described with reference to the drawings, wherein:

FIG. 1 is a diagram of a variable density sound track on a motion picture film;

FIG. 2 is a diagram of a variable area sound track on a motion picture film also showing the elements of an optical sound reproduction apparatus;

FIG. 3 is a diagram showing the dye density curves of various layers of a motion picture film and the composite spectral density curve of the film;

FIG. 4 is a diagram showing the characteristic response of a conventional silicon solar photocell to tungsten illumination;

DETAILED DESCRIPTION OF THE INVENTION

Because motion picture projectors and optical sound apparatus are well-known, the present description will be directed in particular to elements forming part of, or cooperating more directly with, apparatus in accordance with the present invention. Projector and sound system elements not specifically shown or described herein may be selected from those known in the art.

Figure 5:
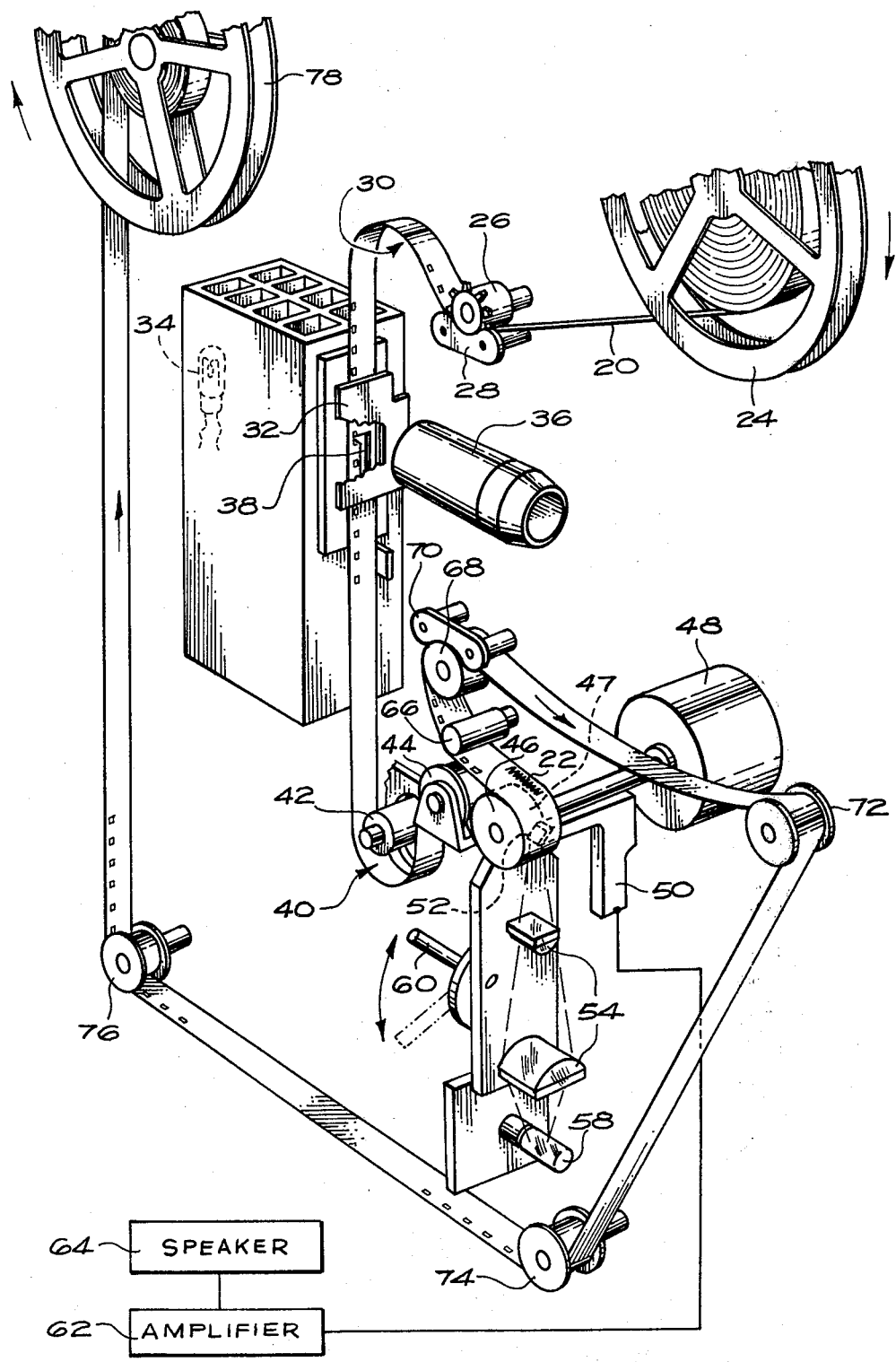
FIG. 5 is a perspective view of an optical sound motion picture projector incorporating a sound photoreceptor in accordance with the invention.

The improved sound photoreceptor is useful with the sound system of a motion picture projector, such as the projector illustrated in FIG. 5. In such a projector a motion picture film 20 having an optical sound track 22 is unwound from a supply reel 24 along a path between a supply sprocket 26 and a movable supply sprocket clamp 28. The sprocket 26 cooperates with a supply reel drive (not shown) to move the film 20 through a loop 30 and into a gate 32. The gate 32 includes a conventional aperture and shutter permitting light emitted by a projection lamp 34 to illuminate the frames on the film 20. The illuminated frames are projected by a lens assembly 36 upon a viewing screen (not shown). A conventional pull-down claw mechanism 38 enters the perforations in the film 20 and intermittently advances the film 20 through the gate 32 in a manner well known to those skilled in the art. The film leaving the gate 32 forms a second loop 40 adjacent a loop-forming roller 42.

The film is then wrapped around a flanged pressure roller 44 and forced against a sound drum 46 having a hollow end portion 47. The drum 46 is driven at a predetermined velocity by a drive mechanism 48. The width of the sound drum 46 is of slightly lesser dimension relative the film such that the area of the sound track 22 extends beyond the edge of the drum thereby forming an aperture for illuminating the optical sound track 22. A sound pickup head assembly 50 is positioned adjacent the sound drum 46 such that a protruding arm of the head 50 extends toward the hollow end portion 47 of the drum 46 and adjacent the illumination aperture. A photoreceptor 52 (as illustrated in broken line within the drum 46) is mounted on the extended arm of the head assembly 50 and adjacent the sound track 22 on the portion of the film 20 extending beyond the drum 46. Several lenses 54 are mounted on an arm 56 for focusing a beam of light from a tungsten exciter lamp 58 through the illumination aperture and upon the sound track 22 as a narrow slit of light. Since the sound track can be on either surface of the film, depending upon what type of film is being used, a sound focus lever 60 is provided to focus the beam of light for maximum crispness of sound. In operation, the photoreceptor 52 responds to focused light transmitted through the sound track 22 and generates an electrical signal that is representative of the density in the track 22. This signal is processed by conventional sound electronics including an amplifier 62 connected to an audio speaker 64.

After passing the sound drum 46, the film 20 traverses a damper roller 66 and is engaged by a take-up sprocket 68. A take-up sprocket clamp 70 holds the film in place on the sprocket 68. The film is then directed by a snubber roller 72 and a pair of guide rollers 74 and 76 to take-up reel 78. A reel drive (not shown) rotates the take-up reel 78 and collects the advancing film on the reel.

Figure 6:
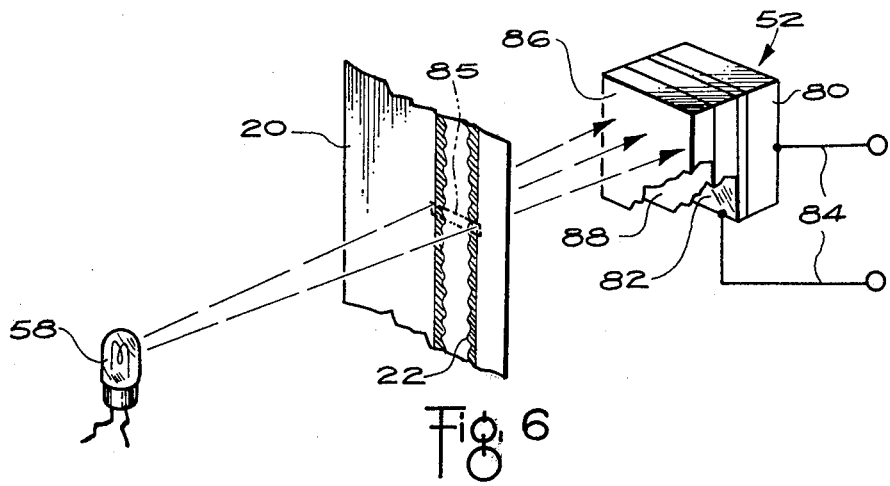
FIG. 6 is a schematic perspective view showing a sound reproduction system in accordance with the invention.

Referring to FIG. 6, the photoreceptor 52 comprises a silicon photocell 80, a transparent electrode 82 and a pair of signal leads 84 connected to the electrode 82 and the silicon photocell 80. Illumination of the photoreceptor is provided by the tungsten lamp 58 which radiates in both the visible and infrared regions of the spectrum. The radiation from the lamp 58 is focused (by the lenses 54) into a narrow slit that strikes a small area 85 of the dye sound track 22. The infrared portion of the radiation traverses the dye sound track 22 substantially unaffected by density in the track while the visible portion of the radiation is selectively absorbed by the density of the track 22 in accordance with the sound record represented by the distribution of the track density. An infrared blocking filter 86 prevents the infrared portion of the radiation transmitted through the sound track from reaching the silicon photocell 80. The visible portion of the radiation modulated by the sound track 22 passes through the filter 86.

An energy-conversion layer 88 is interposed between the filter 86 and the silicon photocell 80 in the path of the modulated visible radiation transmitted through the filter 86. The layer 88 is composed of material that absorbs radiation of predetermined wavelength(s), e.g., in the visible part of the spectrum, and, in response, emits radiation of predetermined longer wavelength(s), e.g., within or near the infrared part of the spectrum. Since the absorbed radiation is modulated by the sound track 22, the newly emitted radiation is similarly modulated. The converted, modulated radiation of longer wavelength passes through the electrode 82 and strikes the silicon photocell 80 which generates an electrical signal on the leads 84 corresponding to the sound record on the track 22.

Figure 7:
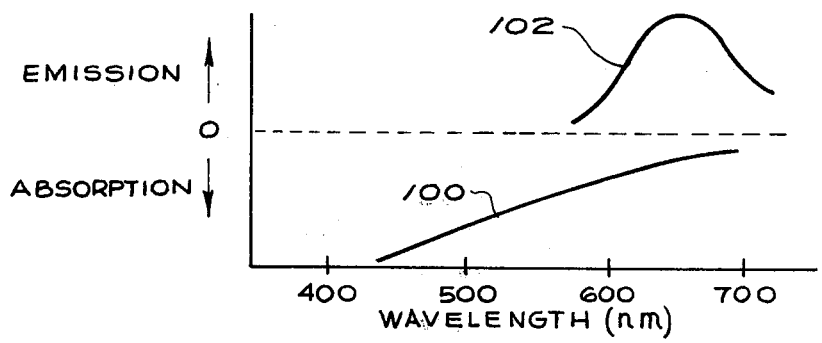
FIG. 7 is an exemplary diagram showing the response characteristic of a typical fluorescing material suitable for use with an apparatus embodying the invention.

Materials exhibiting fluorescence are representative of suitable energy conversion material for the layer 88. FIG. 7 illustrates the absorption region 100 and the emission region 102 of an exemplary fluorescing material. As is true of fluorescent material, impinging radiation is transduced into radiation of longer wavelength. Consequently a material is chosen that absorbs radiation in the visible absorption region 100, i.e., where the dye track density is inherently absorptive, and transduces the radiation to the near infrared region 102, i.e., nearer to the infrared region where the photocell is inherently more receptive. The fluorescent material is further chosen to possess a suitably rapid response time in relation to the rate of movement of the sound track 22 past the photocell 52.

Figure 9A:
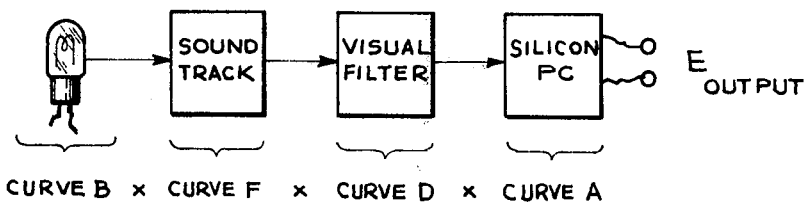
FIGS. 9A and 9B are block diagrams for illustrating the overall characteristic response of a photoreceptor of the prior art and one in accordance with the invention, respectively.

Referring again to FIG. 6, the operation of the photoreceptor 52 in combination with the fluorescing energy conversion layer 88 is explained in connection with the several schematic curves of FIG. 8. These figures are hypothetical representations that are believed to qualitatively explain the physical events associated with the improved response of the photoreceptor 52. Each figure describes the relative response of the system in linear coordinates. The relationship of the several curves of FIG. 8 to the photoreceptors of the prior art and of this invention respectively is further illustrated by the block diagrams of FIGS. 9A (prior art) and 9B. Beginning with FIG. 8A, curve A represents the inherent response of the silicon photocell 80 to uniform radiation across a wide spectral band of, e.g., 400 to 950 nm. Curve B represents the ordinary spectral output of a conventional exciter lamp such as the lamp 58. Curve C is the product (A×B) of curve B with curve A and represents the response of a silicon photocell to unfiltered light from a conventional exciter lamp. The cut-off filtering characteristic of the filter 86 is represented by curve D of FIG. 8B. The effect of the filter 86 is to substantially limit the response of the silicon photocell to a smaller area under one side of curve C. Therefore the response of the silicon photocell to the filtered light from the exciter lamp 58 is ordinarily limited to a product (curve C×curve D) represented by curve E.

Figure 8A:
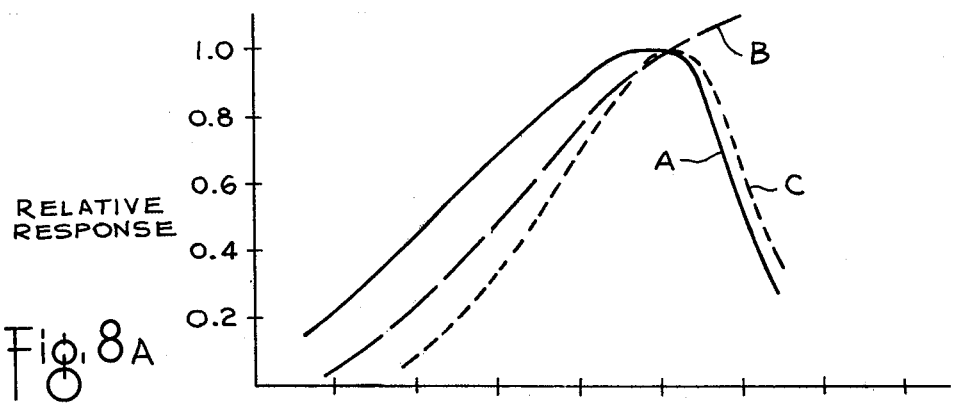
FIGS. 8A–8D are diagrams representing the characteristic response of components of the optical sound reproduction apparatus and showing the improved response due to use of a fluorescing layer.
Figure 8B:
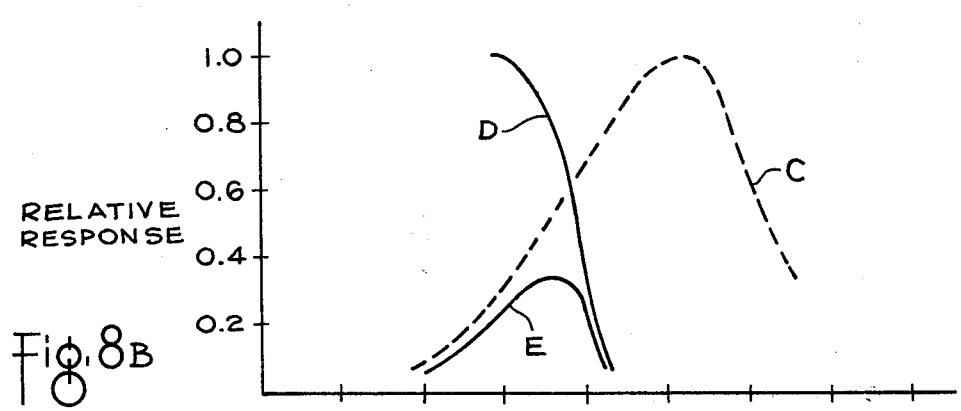
Figure 8C:
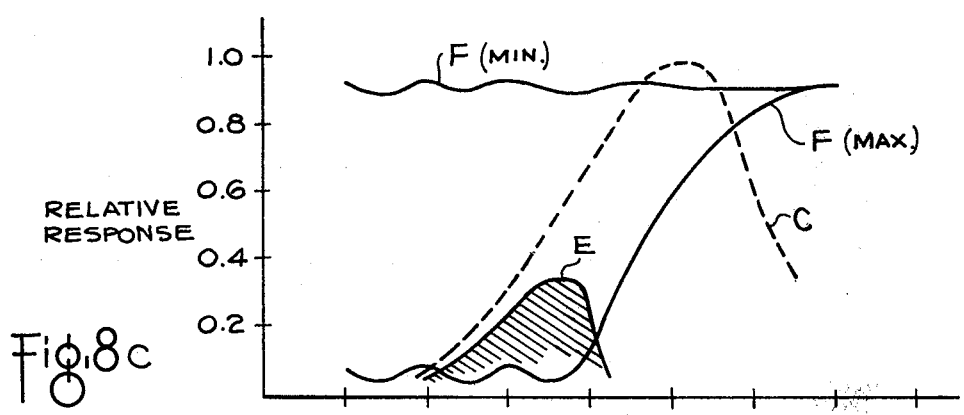

Referring next to FIG. 8C, the composite spectral transmission of the sound track dyes (i.e., the inverse of the spectral absorption discussed in connection with FIG. 3) is represented for a sound track by a family of curves F having curve shapes dependent upon the amount of color dye seen in a small portion of the sound track at any given instant (e.g., the opacity of the area 85 of the dye sound track 22 illustrated in FIG. 6). Curve F is illustrated in FIG. 8C in its two extreme shapes: curve $F_{max}$ illustrating the modulation efficiency of a dense portion of the sound track and curve $F_{min}$ illustrating the modulation efficiency of a relatively clear portion of the sound track. Portions of the sound track having intermediate density will produce a modulation efficiency curve shape between curves $F_{max}$ and $F_{min}$.

The modulated response of the photocell to the filtered exciter lamp is represented by the product (E×F) of the response of the silicon photocell to the filtered exciter light and the spectral transmission of the dye sound track. Since the amplitude of curve F is dependent upon the opacity of the dye sound track, the modulated output of the silicon photocell will vary from a value near zero (when the track is nearly opaque and curve $F_{min}$ applies) to a value approaching curve E (when the track is nearly clear and curve $F_{max}$ applies). This represents the output of a photoreceptor as described and utilized in the prior art with color dye sound tracks. The particular curves involved in this conventional output product—and the portions of the system from which they depend—are schematically summarized in the block diagram of FIG. 9A.

Figure 8D:
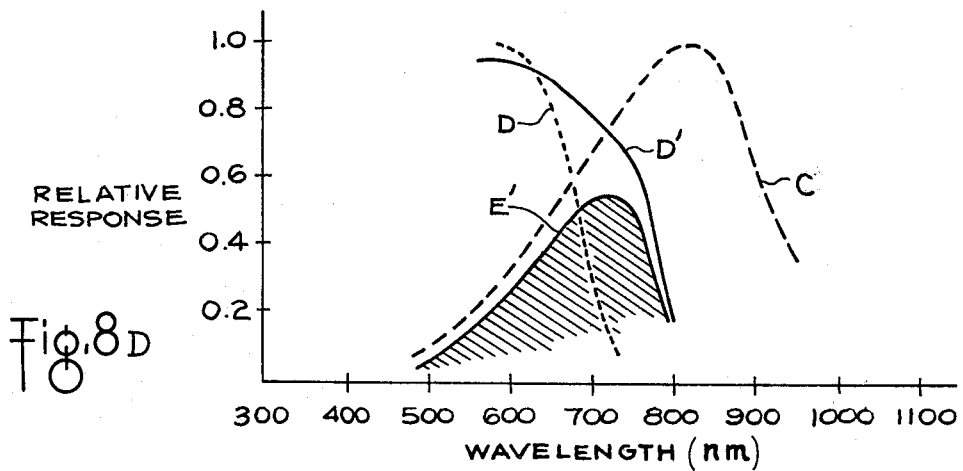

In comparison, FIG. 8D relates to a photocell using a fluorescing layer 88 in accordance with the invention. Most of the visible component of radiation passing through the filter 86 is absorbed by the fluorescently-active material of the layer 88. In accordance with well-known physical principles, the absorbed radiation triggers the re-emission (fluorescence) of radiation of longer wavelength than that absorbed. The effect of the fluorescence is to transpose or shift the band of wavelengths seen by the silicon photocell to generally longer wavelengths. Therefore, if the response due to the spectral transmission of the sound track dyes (curve F) is considered with the subsequent absorption and re-emission of some of the filtered light transmitting the sound track, the effective modulation efficiency curve of the sound track (as seen by the photocell) is shifted into the infrared wavelengths.

Figure 9B:
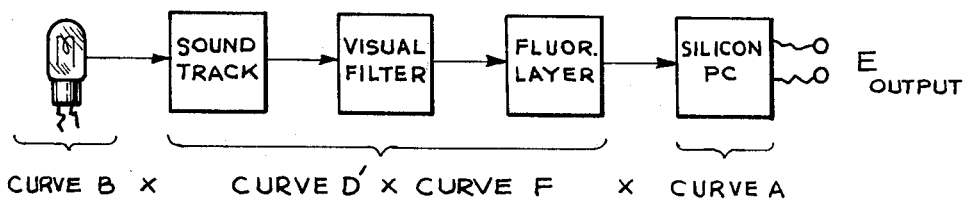

Referring to FIG. 8D, curve D' represents the limit placed upon the electrical output of the photocell (curve C) by the emission characteristics of the fluorescing material used in the fluorescing layer 88. Therefore the response of the silicon photocell to the filtered and spectrally-shifted light from the exciter lamp 58 is limited by the curve E' (the product of curve C and curve D'). It is seen from curve D' that the limit placed upon the photocell output has been extended into the infrared spectral region in comparison to the limit (curve D) introduced by the filter in a photocell in accordance with the prior art. In particular, the modulated output of the silicon photocell will vary from a value near zero (when the track is nearly opaque) to a value approaching curve E' (when the track is nearly clear). Since the integrated area under curve E' is greater than the integrated area under curve E, a photocell in accordance with the invention will have greater peak electrical output, without increasing the noise component, than a photocell in accordance with the prior art. The particular curves involved in the output product in accordance with the invention—and the portion of the system from which they depend—are schematically summarized in the block diagram of FIG. 9B.

Since silicon has a peak response in the infrared portion of the spectrum, the modulated light is effectively transduced between two preferential regions—from the preferential visible modulation region of the dye track 22 to a region nearer the preferential infrared region of the photoreceptor 52, thereby improving the signal-to-noise ratio of the system. Moreover, referring to FIG. 7, it is noted that short wavelength visible radiation, e.g., 400 to about 550 nm., is strongly absorbed by the fluorescing material, causing emissions at longer wavelengths. This short wavelength radiation would, but for the shift in wavelength, have caused little response in the photoreceptor since its response characteristic rapidly falls off in that region (see curve C of FIG. 8A). Therefore, the conversion feature additionally utilizes modulated visible radiation that would have been less effective in activating the photoreceptor. This effect also has the advantage of improving the signal-to-noise ratio of the sound signal.

Since a great number of fluorescent materials absorb visible wavelength radiation and emit longer wavelength radiation, each will increase the efficiency of a silicon photoreceptor to a degree dependent on the amount of wavelength shift. A photoreceptor may utilize any of these materials and achieve at least a degree of enhanced efficiency. Such fluorescent materials are commonly known and may be applied to a silicon photoreceptor by conventional means. Two exemplary groups of fluorescent materials believed to be suitable for use with the invention are listed below:

Group I
 1. Rhombohedral $Al_2O_3$, activated at 0.5% Cr.
 2. Hexagonal CdS, activated 0.01% Ag or Cu.
 3. Cubic ZnS, activated 0.01% Ag or Cu.
 4. $SrS + CaF_2 + SrSO_4 + SmCl_3 + Eu_2(SO_4)_3$
 5. $MgO + TiO_2 + MnO$ Group II
 1. 4-(dicyanomethylene)-2-methyl-6-(p-dimethylaminostyryl)-4H-pyran (catalog #14567)
 2. Nile Blue A Perchlorate (catalog #11953)
 3. 3,3'—Diethyloxatricarbocyanine Iodide (catalog #14354)

Group I represents materials that may be deposited during the manufacture of the silicon photoreceptor itself, e.g., by a molecular deposition process such as vacuum sputtering. These materials, and numerous others, are described in detail in *An Introduction to the Luminescence of Solids,* by Humboldt W. Leverenz (Wiley, 1950), particularly pp. 72, 370 and Table 5.

Group II represents organic fluorescent materials that could be coated upon a suitable substrate prior to attachment to a silicon photoreceptor (or placement elsewhere in the optical path). These materials, and others, are described in detail under the indicated catalog numbers in *Eastman Laser Products,* publication JJ-169, Eastman Kodak Co., 1979. These groups of materials are merely illustrative of fluorescent materials believed to be suitable for use in accordance with the invention and, as emphasized above, are not to be taken as limiting the choice of a suitable fluorescent substance. Moreover, the fluorescent materials may be incorporated into the energy conversion layer by a variety of methods, two of which were mentioned above in connection with Groups I and II. Other conventional methods may be used, for example if the fluorescent material is in powder form, e.g., a phosphor powder, the powder may be combined with a binder and coated upon a substrate to provide the energy conversion layer 88.

The filter 86 may be placed wherever in the light beam is most convenient. However, in adjoining the filter to the photoreceptor, as shown in FIG. 6, the filter may be chosen of such material to act as a trapping layer for the wavelengths emitted by layer 88, thereby further increasing the signal-to-noise ratio. For example, an interference filter may be selected that transmits shorter (visible) wavelength radiation but reflects longer (infrared) wavelength radiation. Visible light modulated by the sound track will be transmitted while infrared radiation unmodulated by the sound track will be reflected out of the light beam. However, visible light that gets past the filter is largely transduced into at least the near infrared. Should some of this transduced radiation of longer wavelength be directed backwards and away from the photoreceptor, it will strike the interference filter and be reflected generally forward and toward the photoreceptor.

While shown in connection with a silicon solar cell, the fluorescing transducing layer may be incorporated with other photoreceptors. For example, a gas phototube having an S-1 surface is predominantly responsive to the infrared region of the spectrum. A fluorescing filter used in accordance with the invention would similarly enhance the signal-to-noise ratio of a sound system using such a tube.

The invention has been described in detail with particular reference to a presently preferred embodiment thereof, but it will be understood that variations and modifications can be effected within the spirit and scope of the invention.

What is claimed is:

1. Optical sound reproduction apparatus for producing sound-related signals from radiation modulated by an optical sound track, the sound track including areas of density preferentially absorptive in a visible region of the spectrum, said apparatus comprising:
    means for illuminating said optical sound track with radiation within said visible region of the spectrum to thereby provide radiation that is modulated by the density areas in the optical sound track;
    means for converting at least a portion of said modulated radiation in said visible region into modulated radiation nearer to the infrared region of the spectrum; and
    photoreceptive means preferentially responsive to said modulated radiation nearer to the infrared region of the spectrum for generating signals representative of the density areas in the optical sound track.

2. The apparatus as claimed in claim 1 in which said converting means comprises fluorescing means for absorbing the modulated radiation within said visible region and emitting modulated radiation in said region nearer to the infrared.

3. Optical sound reproduction apparatus for use with a motion picture projector having illumination means disposed to emit radiation along a path toward a motion picture film, the film including an optical sound track having areas of density predominantly absorptive of visible light radiation in a first spectral region, said reproduction apparatus comprising:
    means positioned in the path relative to the sound track for absorbing at least a portion of the visible radiation in said first spectral region transmitted by the sound track and for emitting radiation predominantly located in a second spectral region nearer to the invisible infrared portion of the spectrum; and
    photoreceptive means responsive to said radiation in said second spectral region for generating signals representative of the density areas in said sound track.

4. The apparatus as claimed in claim 3 wherein said absorbing means comprises a fluorescing material which absorbs visible light radiation in the first spectral region and emits radiation in at least the near-infrared in the second spectral region.

5. The apparatus as claimed in claim 4 wherein said photoreceptive means is responsive to radiation in the near-infrared in the second spectral region.

6. A motion picture projector including apparatus for reproducing sound from an optical sound track on a motion picture film, said reproducing apparatus comprising:
    means for emitting visible radiation in a first predetermined spectral band along a path intersecting the optical sound track;
    transducer means positioned in said path for absorbing the visible radiation within said first spectral band and emitting longer wavelength radiation within at least the near infrared in a second predetermined spectral band in response thereto;
    means for advancing the film relative to said optical path to modulate the visible radiation absorbed by said transducer means in accordance with the sound information on the sound track and to thereby correspondingly modulate the infrared radiation emitted by said transducer means within the second predetermined spectral band; and
    photoreceptive means responsive to the infrared radiation within said second spectral band for generating signals representative of the sound information contained in the sound track.

7. Optical sound reproduction apparatus for use with a motion picture projector having an illumination aperture, a source of illumination for directing visible radiation along a path intersecting the aperture, and means for advancing a motion picture film having an optical dye sound track adjacent said aperture to position the optical dye sound track in said path to modulate part of the radiation within a visible portion of the spectrum in accordance with the sound information on the sound track, the improvement comprising:
    means positioned in said path for converting at least a portion of the modulated radiation in said visible spectral portion into correspondingly modulated radiation of longer wavelength nearer to the invisible infrared portion of the spectrum; and
    a radiation receptor positioned in said path for receiving the longer wavelength radiation nearer to the infrared from said converting means and for generating a signal representative of the sound information contained in the sound track.

8. The apparatus as claimed in claim 7 in which said converting means comprises fluorescing means for absorbing radiation within said visible spectral portion and emitting said radiation nearer to the invisible infrared portion of the spectrum in response thereto.

9. The apparatus as claimed in claim 8 further comprising a filter positioned in the path between said illumination source and said fluorescing means for permitting only visible radiation to pass to said fluorescing means.

10. The apparatus as claimed in claim 9 in which said filter comprises an interference filter so positioned as to redirect any radiation emitted by said fluorescing means back onto said radiation receptor.

11. In a motion picture projector having an illumination path, a source of illumination for directing visible radiation along the illumination path and apparatus for reproducing sound from an optical sound track on a motion picture film, said reproducing apparatus comprising:

an illumination aperture positioned in said illumination path;

means for advancing the motion picture film adjacent said illumination aperture with the optical sound track positioned in said illumination path to modify the visible radiation in accordance with the sound information on the sound track;

fluorescing means positioned in said illumination path for absorbing visible radiation modified by the sound track and emitting longer wavelength radiation extending at least into the near infrared portion of the spectrum in response thereto; and photoreceptive means responsive to said longer wavelength radiation for generating signals representative of the modified visible radiation.

12. In a motion picture projector having an illumination path, a source of illumination for directing radiation along the illumination path and apparatus for reproducing sound from an optical dye sound track on a motion picture film, the dyes of the sound track being absorptive primarily in the visible portion of the spectrum, said reproducing apparatus comprising:

an illumination aperture positioned in said illumination path;

means for advancing the motion picture film adjacent said illumination aperture with the optical dye sound track positioned in said illumination path to modify the visible radiation in accordance with the sound information represented by the dye of the sound track;

a filter positioned in the path for blocking all but the visible portion of the radiation;

a fluorescing member positioned in said illumination path for absorbing the filtered visible radiation modified by the sound track and emitting radiation nearer to the infrared region in response thereto; and a silicon photoreceptor having maximum response in the infrared spectral region and positioned adjacent said fluorescing member for receiving the emitted radiation and generating electrical signals representative of the modified visible radiation.

13. A photoreceptor for transducing an electrical signal from radiation transmitted by an optical sound track on a motion picture film, the transmitted radiation including visible radiation modified by areas of density in the sound track and infrared radiation substantially unmodified by the sound track, said photoreceptor comprising:

a filter for blocking the unmodified infrared radiation and transmitting the modified visible radiation:

a fluorescing member positioned adjacent said filter for absorbing the filtered visible radiation modified by the sound track and emitting modulated radiation nearer to the infrared region in response thereto; and a silicon member preferentially responsive to infrared radiation and positioned adjacent said fluorescing member for absorbing said emitted, modulated radiation and generating electrical signals representative of the modified visible radiation.

14. A method for reproducing a sound signal from an optical sound track on a motion picture film, the sound track including areas of density preferentially absorptive in a visible region of the spectrum, said method comprising the steps of:

illuminating the optical sound track with radiation in said visible spectral region;

advancing the motion picture film to modulate the radiation in said visible spectral region transmitted by the sound track;

converting at least a portion of said modulated radiation within said visible spectral region into modulated radiation within a longer wavelength region of the spectrum nearer to the infrared; and generating a sound signal responsive to said modulated radiation within said longer wavelength spectral region.

15. A method for reproducing a sound signal from an optical dye sound track on a motion picture film, the sound track including areas of dye density preferentially absorptive in a visible region of the spectrum, said method comprising the steps of:

illuminating the optical dye sound track with radiation from a source including visible and infrared emissions;

advancing the motion picture film relative the source of illumination to modulate the visible radiation in accordance with the sound information represented by the dye density of the sound track;

filtering the radiation transmitted by the sound track to block the unmodulated infrared radiation emitted by the source and pass the visible radiation modulated by the sound track;

converting at least a portion of the modulated visible radiation into similarly modulated infrared radiation; and generating an electrical signal responsive to said modulated infrared radiation.

* * * * *